United States Patent [19]
McNab

[11] Patent Number: 5,275,447
[45] Date of Patent: Jan. 4, 1994

[54] HOSE COUPLING

[75] Inventor: John McNab, Palo Alto, Calif.

[73] Assignee: Misti Maid Inc., Newark, Calif.

[21] Appl. No.: 930,234

[22] Filed: Aug. 14, 1992

[51] Int. Cl.$^5$ .................................. F16L 25/06
[52] U.S. Cl. ........................ 285/177; 285/243;
285/322; 285/423; 285/249
[58] Field of Search ............... 285/243, 249, 255, 177,
285/322, 423

[56] References Cited
U.S. PATENT DOCUMENTS

| | | | |
|---|---|---|---|
| 1,509,802 | 9/1924 | Weigand | 285/243 |
| 2,253,691 | 8/1941 | Darling | 285/243 |
| 3,361,449 | 1/1968 | Parro | 285/255 X |

*Primary Examiner*—Dave W. Arola
*Attorney, Agent, or Firm*—Peter J. Dehlinger

[57] ABSTRACT

A base member has an elongate bore, a base end, a distal end, an elongate inner sleeve extending from the base end to the distal end, a generally frusto-conical outer surface having a larger diameter adjacent to the base end and a reduced diameter at the distal end, and a radially extending flange attached to the base end of the inner sleeve. The outer surface of the inner sleeve has axially spaced protrusions positioned along its length. An outer sleeve extends around the inner sleeve, has an annular base portion positioned axially adjacent to the flange, and a plurality of finger portions attached to the base portion and distributed in mutually opposing relationship circumferentially about the inner sleeve and extending from adjacent to the base end of the inner sleeve to the distal end of the inner sleeve. The finger portions are movable radially relative to the inner sleeve and have frusto-conical inner surfaces generally conforming to the outer surface of the inner sleeve. The outer sleeve has a distal end adjacent to the distal end of the inner sleeve that is sufficiently radially flexible to allow a hose end to be inserted on the inner sleeve. The inner surface of the finger portions also has axially spaced protrusions that are axially offset relative to the protrusions of the inner sleeve. The protrusions of the outer sleeve are urged between the protrusions of the inner sleeve when the distal end of the outer sleeve is urged toward the distal end of the inner sleeve. The outer sleeve further has an outer surface that is threaded axially. The base of the inner sleeve has a groove that receives a lip on the base end of the outer sleeve for anchoring the outer sleeve axially relative to the inner sleeve. A clamping nut is mounted on the outer sleeve and has an inner bore that is matingly threaded with the outer surface of the outer sleeve, for urging the finger portions toward the inner sleeve when a hose end is positioned on the inner sleeve, thereby clamping the hose end to the inner sleeve.

6 Claims, 2 Drawing Sheets

HOSE COUPLING

1. FIELD OF THE INVENTION

The present invention relates to hose couplings, and more particularly to hose couplings having an inner sleeve and an outer movable jaw.

2. BACKGROUND OF THE INVENTION

Hose systems, such as drip irrigation systems require many connections between a hose and another hose or a fixture. As used herein, the term hose is referred to generically as encompassing any form of piping, hose or tubing, with the structure of the embodiment of the invention designed consistent with the materials of the hose that is being coupled. Drip systems in particular are used in a wide variety of applications and layouts, making it unreasonable to provide hoses of fixed lengths for use in assembling such systems. These systems also typically use flexible hoses of various sizes which must also be connected together.

Drip systems are usually constructed by building the system in the field or area in which it is used, and once it is constructed is left in position, or moved very little. It is thus desirable to construct them in what may be referred to as a single, permanent configuration. It is important that the connections be quick and easy to make, and that the connectors or couplers be relatively simple to make and use, yet capable of withstanding physical stresses. Conventional couplers use a very simple friction fit that is subject to failure from excessive fluid pressure in the system, or from the application of excessive forces during handling or use.

SUMMARY OF THE INVENTION

It is a general object of the invention to meet the desired objectives stated above.

In particular, it is an objective to provide a hose coupling that is easily applied to the end of a hose, and yet provides a secure grip on the hose to keep the couplings from pulling apart under usual handling and use conditions.

It is a further object of the present invention to provide a hose coupling that is somewhat universal in the sense that it can be used to couple hoses of different diameters.

Generally, the invention includes an elongate inner sleeve having a base end, a distal end, a generally frusto-conical outer surface having a larger diameter at the base end and a reduced diameter at the distal end, and an axially extending bore An outer sleeve extends around the inner sleeve and has a frusto-conical inner surface generally conforming to the outer surface of the inner sleeve. The outer sleeve has a distal end adjacent to the distal end of the inner sleeve that is sufficiently radially flexible to allow a hose end to be inserted on the inner sleeve. A clamp urges the distal end of the outer sleeve toward the inner sleeve with a hose end positioned on the inner sleeve, thereby clamping the hose end to the inner sleeve.

In the preferred embodiment, a flange is attached to the base end of the inner sleeve and extends radially from it. The outer surface of the inner sleeve has axially spaced protrusions positioned along its length. The outer sleeve has a plurality of finger portions attached to the base portion, distributed circumferentially about the inner sleeve and extending from adjacent to the base end of the inner sleeve to the distal end of the inner sleeve. The finger portions are movable radially relative to the inner sleeve and have frusto-conical inner surfaces generally conforming to the outer surface of the inner sleeve. The inner surface of the finger portions also have axially spaced protrusions that are axially offset relative to the protrusions of the inner sleeve whereby the protrusions of the outer sleeve are urged between the protrusions of the inner sleeve when the distal end of the outer sleeve is urged toward the distal end of the inner sleeve. The outer sleeve further has an outer surface that is threaded axially.

Means are preferably provided for anchoring the outer sleeve axially relative to the inner sleeve. A clamping nut is mounted on the outer sleeve and has an inner bore that is matingly threaded with the outer surface of the outer sleeve. The finger portions urge the hose toward the inner sleeve when a hose end is positioned on the inner sleeve, thereby clamping the hose end to the inner sleeve.

This hose coupling has few parts. They are easy to assemble and use. When attached to the end of a hose, there is positive resistance to removal of the hose, particularly by action of the offset protrusions gripping the hose. Further, this embodiment will accept a variety of inner hose diameters, determined generally by the size range of the outer surface of the inner sleeve. These and other features and objects of the invention will become more fully apparent when the following detailed description of the invention is read in conjunction with the accompanying drawings.

DETAILED DESCRIPTION OF THE INVENTION

Figure 1:
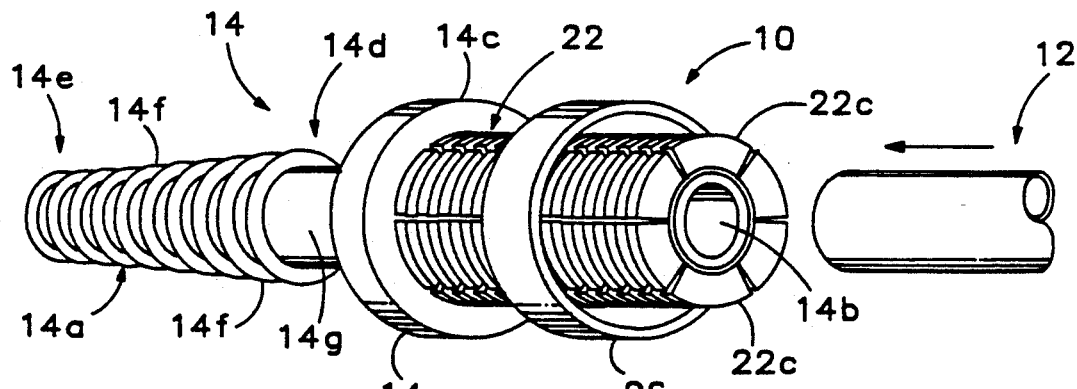
FIG. 1 is an isometric view of a coupling made according to the invention.

Referring initially to FIGS. 1-4, a coupling 10 made according to the invention is shown for coupling hoses, such as hose 10, together, or coupling a hose to another fixture. The preferred embodiment of coupling 10, as illustrated, provides specifically for coupling two hoses together. Other forms of the coupling would provide for coupling with substantially larger or smaller hoses, or for connection with a fixture, such as a threaded pipe, valve, or the like.

Coupling 10 includes an elongate base member 14 having a first inner sleeve portion 14a, a second, and oppositely disposed, inner sleeve portion 14b, and a radially extending flange 14c. Base member 14 has an axially extending bore 16 that functions as a fluid passageway between two hoses connected respectively to the inner sleeve portions. The end 14d of each inner sleeve portion adjacent to the flange is referred to as a base or proximal end. Correspondingly, the end 14e extending away from the flange is referred to as the distal end.

Each sleeve portion has a series of annular protrusions or teeth, such as tooth 14f, extending radially from an outer surface 14g. These teeth are spaced axially apart, as shown, and preferably point away from distal end 14e. It will be further noted that, as is particularly shown in FIG. 2, the distal end 14e has a reduced diameter $D_1$ relative to diameter $D_2$ of the base end. Thus, the inner sleeve portions have what may be referred to generally as a frusto-conical shape. It is particularly important that the diameter of the inner sleeve portion taper from larger diameter $D_2$ down to smaller diameter $D_1$ even though it may not taper in a straight line as shown. For simplicity, then, the shape is referred to generally as frusto-conical even though it may vary from the shape shown.

Figure 2:
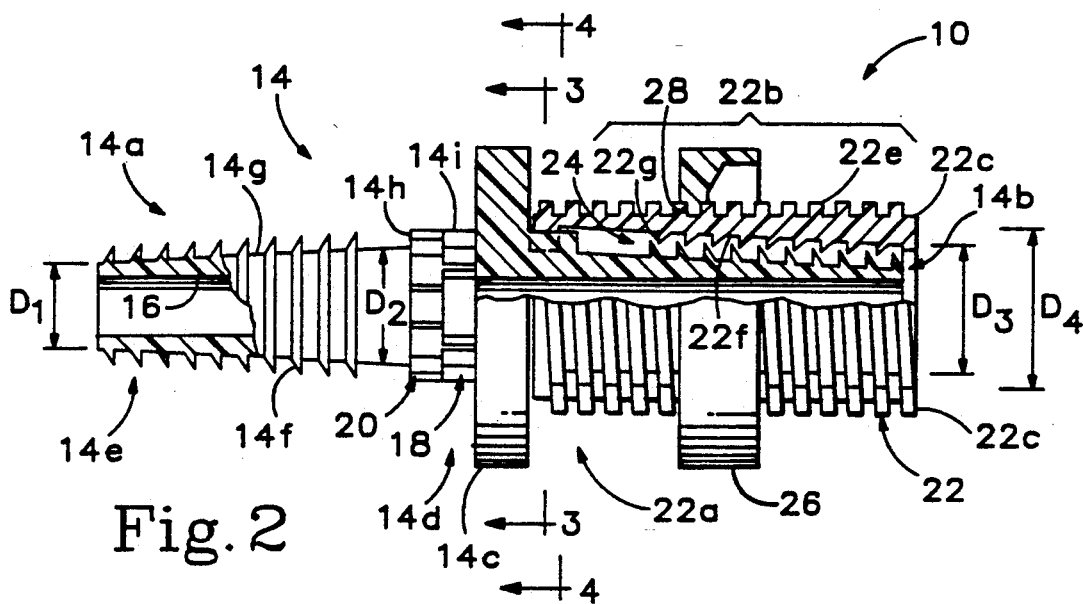
FIG. 2 is a side view with fragmented cross section of the coupling of FIG. 1.
Figures 3, 4:
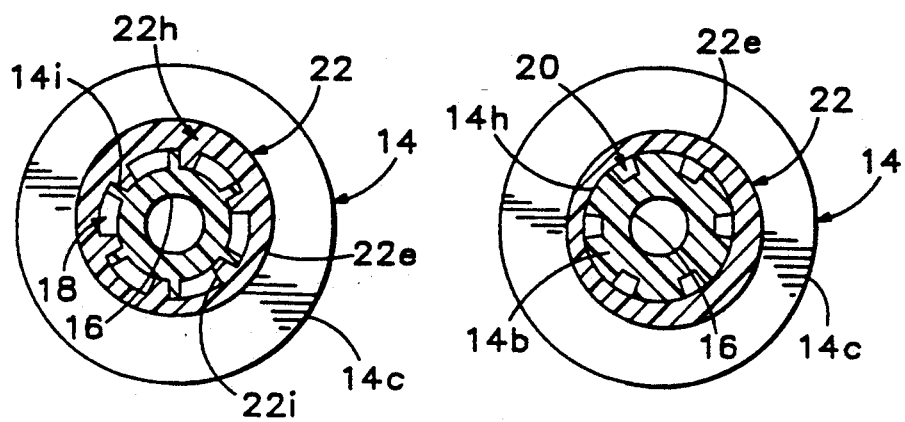
FIG. 3 is a cross section of the coupling of FIG. 2 taken along line 3—3.
FIG. 4 is a cross section of the coupling of FIG. 2 taken along line 4—4.

Referring particularly to FIGS. 2-4, in the base end of the inner sleeve portion, spaced away from flange 14c, is an annular small flange or ridge 14h. Ridge 14h has a height generally conforming to the height of annular teeth 14f. Ridge 14g with flange 14c thus form a channel 18 extending around the circumference of the base member adjacent to the flange. The ridge has six circumferentially equally spaced openings, such as opening 20. Circumferentially distributed about channel 18 are webs, such as web 14i. These webs are circumferentially offset from the channels.

Disposed around inner sleeve portion 14b (and portion 14a when it is set up to be connected to a hose) is an outer sleeve 22 having base and distal ends 22a and 22b, respectively, corresponding to the associated ends of the inner sleeve portions of the base member. The distal end of the outer sleeve is formed as six identical and separate extensions or fingers, such as finger 22c. Fingers 22c are integrally joined at an annular base end 22a that extends uninterruptedly around the base end of the inner sleeve portion.

The outer sleeve has an outer surface 22e and an inner surface 22f. Outer surface 22e is threaded, as shown. The thickness of the outer sleeve is thinner at the base end than at the distal end. The outer surface, when coupling 10 is not being used to couple a hose end, as shown in FIG. 2, has a substantially constant effective diameter along its length. The inner surface, however, has a diameter that progressively decreases with distance from the base end toward the distal end. Preferably, the slope of the inner surface of the outer sleeve conforms to the slope of the outer surface of the inner sleeve portion.

As shown in FIG. 2, inner surface 22f has radially inwardly directed teeth 22g that align with the spaces between teeth 14f of the base member. These teeth are also preferably directed away from distal end 22b. Teeth 14f and 22g thus form a labyrinth-like or serpentine passageway 24 between the ends of the outer sleeve and along the adjacent surfaces of the outer sleeve and inner sleeve portion of the base member.

Referring particularly to FIG. 3, end 22a of the outer sleeve has a continuous annular expanse 22h from which six equally spaced, radially inwardly projecting feet 22i subtend. These feet are sized and positioned to pass through openings 20 when outer sleeve 22 is placed in position around inner sleeve portion 14a or 14b.

Threadedly received on the outer surface of the outer sleeve is a clamping nut 26. Nut 26 has a threaded center bore 28 to provide for threaded movement of nut 26 axially along the outer surface of the outer sleeve, as shown.

During use, an outer sleeve 22 is positioned around an inner sleeve portion 14a or 14b. As has been mentioned, teeth 22g are positioned in alignment with openings 20 in ridge 14h. The outer sleeve is then moved toward flange 14c until the teeth are in channel 18. Nut 26 is then threaded onto outer sleeve 22 if it was not done previously. The nut is threaded until it is at base end 22a of the outer sleeve. During turning of the nut on the outer sleeve, rotation of the outer sleeve 22 relative to inner sleeve portion 14 is limited by the contacting of a web 14i by each tooth 22g in channel 18. It will be seen, that teeth 22g contact webs 14i regardless of the direction the outer sleeve is rotated relative to the inner sleeve portion.

Figure 5:
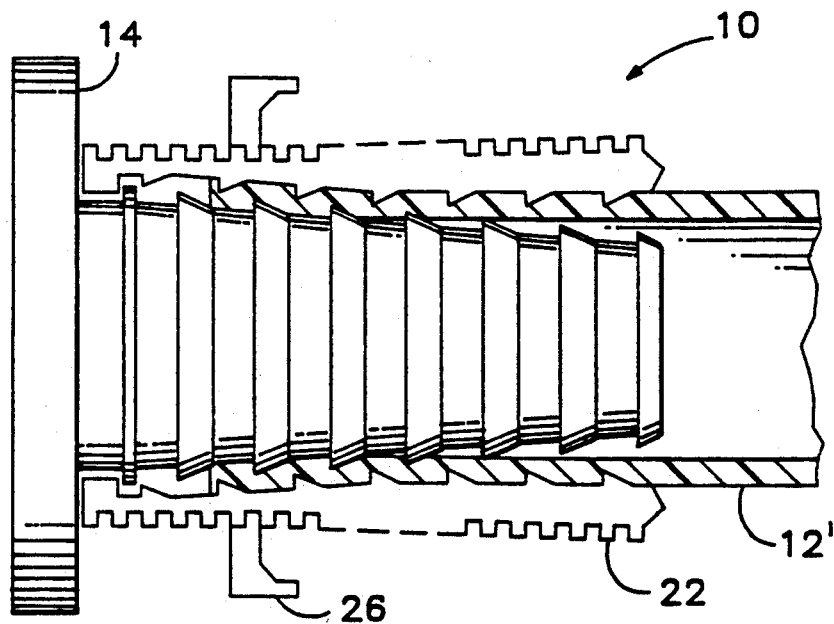
FIG. 5 shows a simplified cross section of the coupling of FIG. 1 in operative position coupling a larger diameter hose.

If a larger diameter hose is to be coupled, it is placed onto inner sleeve portion 14a or 14b until it will not travel further without substantial pressure. In order to accommodate this, fingers 22c bend radially outwardly to accommodate the thickness of the hose covering between the inner surface of the outer sleeve and the outer surface of the inner sleeve portion. Nut 26 is then threaded back toward the distal end of the outer sleeve until resistance is noticed. By continuing to thread the nut further, the outer sleeve fingers 22c are pressed or urged toward the inner sleeve portion. This forces the teeth in the outer sleeve and inner sleeve portions into the hose covering, securing it in place. The result is as illustrated in FIG. 5.

Figure 6:
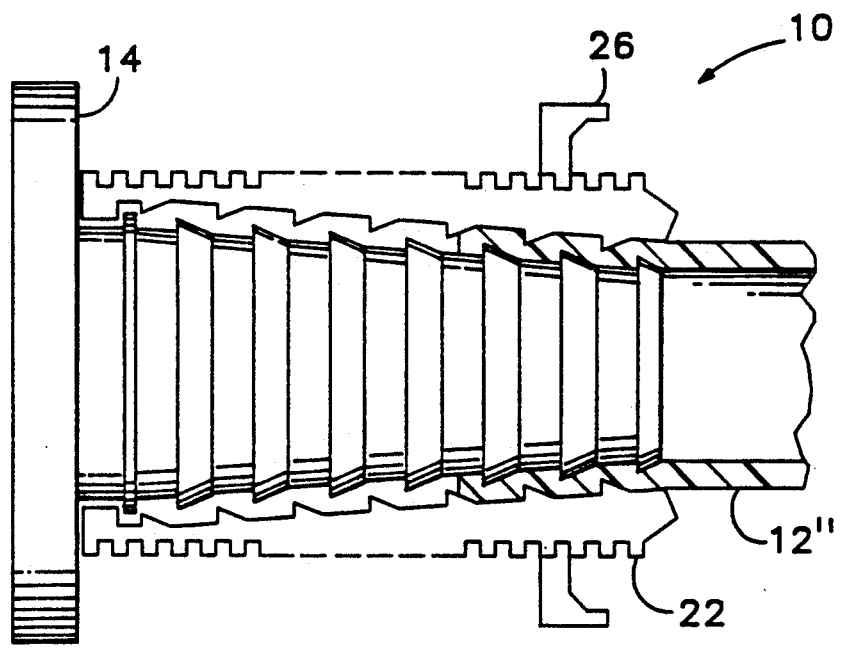
FIG. 6 shows a partial cross section similar to FIG. 5 with the coupling in operative position coupling a smaller diameter hose.

FIG. 6 illustrates how coupling 10 appears after a smaller diameter hose is coupled. Since the hose has a smaller diameter, it does not slip onto the inner sleeve portion as far as the larger hose did. It is thus necessary to turn nut 26 on the outside surface of the outer sleeve until resistance is met. The outer sleeve fingers are thicker adjacent to the distal end, and thus do not flex as much as is the case for a larger hose. This thickness adds rigidity to the coupling and compensates for the fact that the fingers are not connected along the distal ends.

It can therefore be seen that the present invention provides a hose coupling that is easy to use, accommodates hoses of different sizes, and has relatively few parts. Further, the coupling is positively connected to the hose, and does not rely on a simple friction fit, as do most conventional drip irrigation connectors.

Although the invention has been described with respect to a particular embodiment and application, it will be apparent to one skilled in the art how the method and apparatus of the invention can be modified or adapted to a variety of other applications. The embodiment is provided for the purpose of illustration and not limitation. The invention is therefore defined by the claims and any modifications and interpretations thereof according to the doctrine of equivalents.

It is claimed:

1. A coupling device for coupling hoses having the same or different inner diameters, comprising
    a base member having a central flange and first and second elongate inner sleeve portions extending from opposite sides of said central flange, where each inner sleeve portion has a base end, attached to said flange a distal end, a generally frusto-conical outer surface having a larger diameter at the base end and a reduced diameter at the distal end for receiving hoses of different inner diameters thereon, and an axially extending bore which is in fluid communication with the bore of the other sleeve portion;

carried on each sleeve portion, a plurality of finger portions distributed in mutually opposing relationship circumferentially about that sleeve, said finger portions defining an outer sleeve extending around the inner sleeve and having a frusto-conical inner surface generally conforming to the outer surface of the inner sleeve, said finger portions being movable radially with respect to the associated sleeve portion; and clamping means associated with each outer sleeve for urging the finger portions of the outer sleeve toward the inner sleeve with a hose end positioned on the inner sleeve, thereby clamping the hose end to the inner sleeve.

2. A coupling device according to claim 1 wherein each outer sleeve has an outer surface that is threaded axially and the associated clamping means includes a clamping nut having an inner bore that is matingly threaded with the outer surface of the outer sleeve.

3. A coupling member according to claim 2 further comprising means for limiting circumferential movement of the outer sleeve relative to the inner sleeve.

4. A coupling member according to claim 1 wherein the outer sleeve is spaced radially sufficiently close to the inner sleeve that the distal end of the outer sleeve flexes radially away from the inner when a hose end is positioned on the inner sleeve.

5. A coupling member according to claim 1 wherein the outer surface of the distal end of the inner sleeve has axially spaced protrusions, and the inner surface of the distal end of the outer sleeve also has axially spaced protrusions, the protrusions of the outer sleeve being axially offset relative to the protrusions of the inner sleeve whereby the protrusions of the outer sleeve are urged between the protrusions of the inner sleeve when the distal end of the outer sleeve is urged toward the distal end of the inner sleeve.

6. A coupling for connecting with a drip irrigation hose comprising:

a base member having an elongate bore, a base end, a distal end, an elongate inner sleeve extending from the base end to the distal end, a generally frusto-conical outer surface having a larger diameter adjacent to the base end and a reduced diameter at the distal end, and a radially extending flange attached to the base end of the inner sleeve, the outer surface of the inner sleeve having axially spaced protrusions positioned along its length;

an outer sleeve extending around the inner sleeve and having an annular base portion positioned axially adjacent to the flange, and a plurality of finger portions attached to the base portion and distributed in mutually opposing relationship circumferentially about the inner sleeve and extending from adjacent to the base end of the inner sleeve to the distal end of the inner sleeve, the finger portions being movable radially relative to the inner sleeve, the finger portions having frusto-conical inner surfaces generally conforming to the outer surface of the inner sleeve, the outer sleeve having a distal end adjacent to the distal end of the inner sleeve that is sufficiently radially flexible to allow a hose end to be inserted on the inner sleeve, the inner surface of the finger portions also having axially spaced protrusions, the protrusions of the outer sleeve being axially offset relative to the protrusions of the inner sleeve whereby the protrusions of the outer sleeve are urged between the protrusions of the inner sleeve when the distal end of the outer sleeve is urged toward the distal end of the inner sleeve, the outer sleeve further having an outer surface that is threaded axially;

means for anchoring the outer sleeve axially relative to the inner sleeve; and a clamping nut mounted on the outer sleeve and having an inner bore that is matingly threaded with the outer surface of the outer sleeve, for urging the finger portions toward the inner sleeve when a hose end is positioned on the inner sleeve, thereby clamping the hose end to the inner sleeve.

* * * * *